United States Patent

[11] 3,612,104

| [72] | Inventor | Agustin A. Busquets<br>404 Virginia Ave., Apt. 6, Royal Oak, Mich. 48067 |
|---|---|---|
| [21] | Appl. No. | 844,812 |
| [22] | Filed | July 25, 1969 |
| [45] | Patented | Oct. 12, 1971 |

[54] MIXING AND DIVERTER WATER VALVE
4 Claims, 20 Drawing Figs.

[52] U.S. Cl.................................................. 137/637.4, 251/309, 137/597
[51] Int. Cl...................................................... F16k 11/20
[50] Field of Search............................................. 251/309; 137/636, 636.1, 636.2, 636.3, 636.4, 637.5, 637.4, 637.3, 637.2, 637, 597

[56] References Cited
UNITED STATES PATENTS

| 685,510 | 10/1901 | Flint............................ | 137/637.4 X |
| 2,158,342 | 5/1939 | Trader......................... | 137/637.4 |
| 2,626,635 | 1/1953 | Eckstein...................... | 137/637.4 X |
| 3,460,568 | 8/1969 | Busquets..................... | 137/597 |

*Primary Examiner*—Clarence R. Gordon
*Attorney*—Cullen, Sloman & Cantor

ABSTRACT: A fluid mixing valve having a pair of hot and cold water inlets and two axially spaced outlets and a pair of additional spaced outlets, with a rotatable valve sleeve for establishing selective communication of said inlets with any one of the three sets of outlets, and variably controlling the volume of flow from said inlets to a mixing chamber, and a pair of separate opposed valve elements mounted within said valve sleeve for independent axial adjustments, one valve element having an inlet port to control the temperature of fluids into said mixing chamber and an outlet in registry with one of said body outlets, the other of said valve elements having a pair of outlet ports in registry respectively with the other body outlets and wherein axial adjustment of the second valve element determines the flow of fluid from the mixing chamber through either or both of the axially adjacent pair of body outlets.

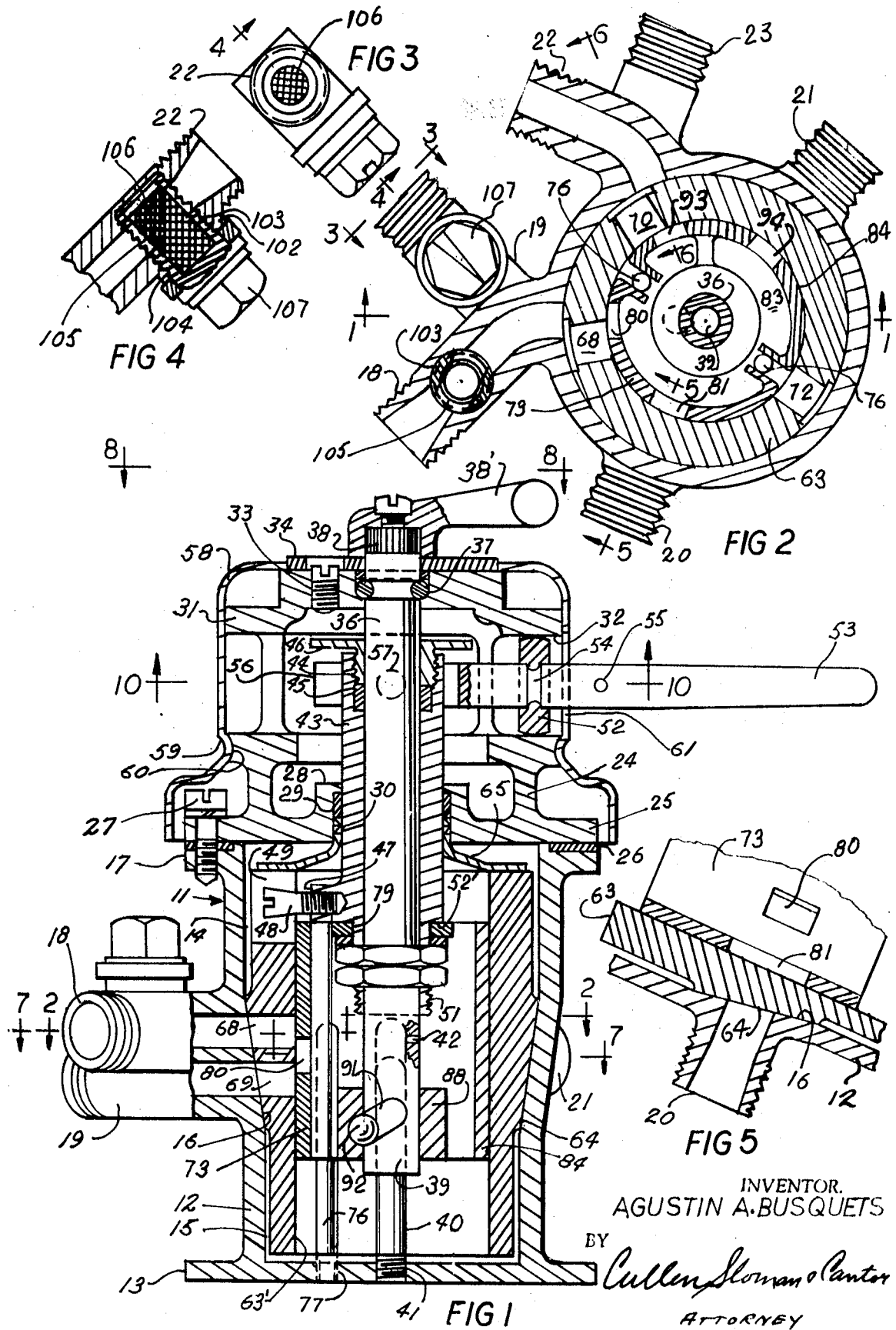

PATENTED OCT 12 1971 3,612,104

INVENTOR.
AGUSTIN A. BUSQUETS
BY
Cullen Sloman & Cantor
ATTORNEY

PATENTED OCT 12 1971

INVENTOR.
AGUSTIN A. BUSQUETS
BY
Cullen Sloman Pantos
ATTORNEY

MIXING AND DIVERTER WATER VALVE

BACKGROUND OF THE INVENTION

Heretofore various construction of mixing and diverter water valves have been provided by which hot and cold water directed to a valve body in varying proportions may be delivered to one or more valve body outlets. In many of these constructions the mechanism and structure involved is complicated and costly and impractical. In my copending U.S. Pat. application Ser. No. 602,838, entitled Mixing and Diverter Water Valve, filed in the U.S. Pat. office Dec. 19, 1966, now U.S. Pat. No. 3,460,568 I provided a first improved mixing valve structure believed an improvement over structures heretofore provided for accomplishing this result.

The present application includes the disclosure of the still improved mixing valve construction.

It is an object of the present invention to provide a mixing and diverter water valve which in addition to the usual hot and cold water inlets has a double outlet for supplying a temperature controlled water to one or a pair of outlets may show for example such as the main shower head and/or a shower spray and wherein operation of the present valve controls the delivery of mixed fluids through either or both of said double outlets as accurate control as to volume and temperature.

It is another object to provide in the present mixing and diverter valve additional single outlets by which the fluid from within the mixing chamber under the control of the valve assembly may be delivered to either of the said single outlets or spouts in the desired volume and temperature.

It is another object to provide in a mixing and diverter valve having three sets of outlets, a first tapered valve for determining the selection of one of the three outlets for delivery of mixed fluids and the volume thereof, and an additional first valve element axially adjustable within the tapered valve adapted for regulating the temperature of fluids directed to the mixing chamber with an outlet for communication with one of the valve body outlets, and a second valve element also within the tapered valve in opposed relation to the first valve element and independent thereof and which upon longitudinal adjustment is adapted to regulate the flow of mixed fluids to either or both of the double outlets in varying degrees or for one of the other said double outlets at the same time providing communicating outlet ports to permit delivery of fluid to the other of the single outlets.

These and other objects will be seen from the following specification and claims in conjunction with the appended drawings in which:

FIG. 1 is a fragmentary, partly broken away longitudinal section of the present mixing valve being taken in the direction of arrows 1—1 of FIG. 2.

FIG. 2 is a plan section taken in the direction of arrows 2—2 of Fig. 1.

FIG. 3 is an end view taken in the direction of arrows 3—3 of FIG. 2.

FIG. 4 is a fragmentary section taken in the direction of arrows 4—4 of FIG. 3.

FIG. 5 is a fragmentary section taken in the direction of arrows 5—5 of FIG. 2.

Figure 8:
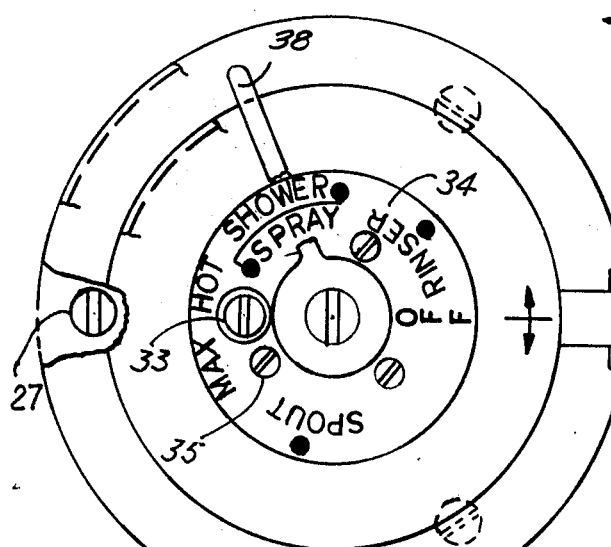
FIG. 8 is a fragmentary plan view taken in the direction of arrows 8—8 of FIG. 1.

The present mixer and distributor valve generally indicated at 11, FIG. 1, includes a hollow, generally cylindrical vertically arranged valve body 12 closed at one end at its mounting base 13 and having bore 14, counterbore 15 and therebetween tapered bore 16.

The body adjacent bore 14 at its upper end terminates in the apertured flange 17.

Upon said body are a pair of axially spaced inlet ports namely hot water inlet 18 and cold water inlet 19. As shown in FIG. 2, upon said body there is also provided single outlet spout 20, spaced therefrom single outlet 21, and spaced therefrom the double axially spaced outlets 22 and 23.

Valve cover 24, FIG. 1 includes mounting flange 25 which overlies body flange 17 and with gasket 26 interposed is fixedly secured thereto by a series of fasteners 27.

Said cover includes the internal flange 28 mounting seal 29 and the pair of apertured washers 30 in registry with vertically adjustable rotatable actuator sleeve 43 hereafter described.

Figure 10:
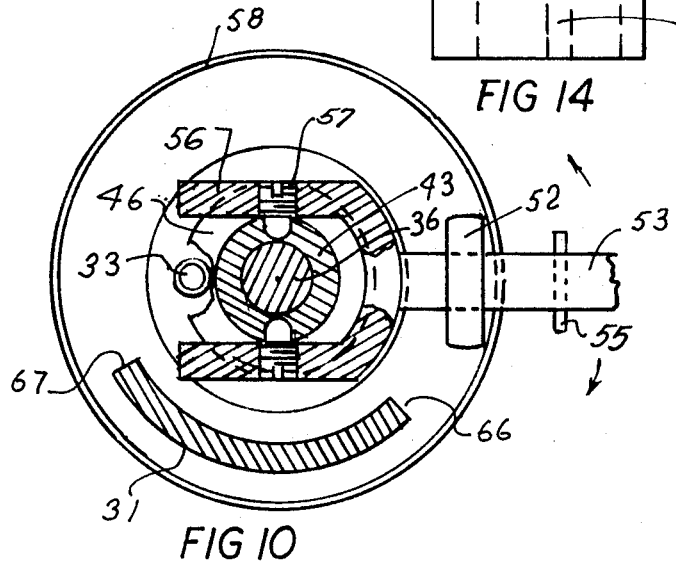
FIG. 10 is a bottom plan section taken in the direction of arrows 10—10 of FIG. 1.

Cover top plate 31 defines with the main cover 24 the horizontally elongated arcuate slot 32 thus defining as shown in FIG. 10 regulator arm stop 66 and 67 which limit rotary movement of the tapered valve hereafter described.

Adjustable stop 33 is threaded through the top of cover 24 and is exposed through an aperture in cover plate 34, FIG. 8 secured to said cover by fasteners 35.

The elongated control stem 36 is axially disposed within the valve body and rotatively journaled through an axial aperture in cover 24 with a suitable O-ring seal 37 interposed, FIG. 1. The upper end of said control stem is knurled at 38 adapted to receive hand control 38' for selective rotation of stem 36.

Axial bore 39 at the opposite end of said stem guidably receives the upright axial pin 40 anchored at 41 to the body base 13, FIG. 1, the said bore 39 having a pressure release passage 42 communicating with the mixing chamber, FIG. 1.

ACTUATOR SLEEVE

Rotatable vertically adjustable actuator sleeve 43 is rotatably and longitudinally mounted for relative movements upon and around control stem 36 and includes at its upper end threaded bore 44 containing seal 45 and cap stop plate 46.

The latter stop plate is in vertical registry with the adjustable stop 33 for limiting longitudinal movement of the actuator sleeve in one direction.

The lower end of actuator sleeve includes boss 47 mounting the tapered screw 48 which is slidably and operatively positioned within an elongated tapered slot 49 formed within rotatable tapered valve 63, FIG. 1.

The actuator sleeve 43 includes at its lower end elongated threaded shank 51 with adjacent shoulder, the said shank being loosely disposed through ring 79 forming a part of one of the semicylindrical control valve elements hereafter described, loosely retained thereon by suitable bolts and a washer as shown in FIG. 1.

Fulcrum 52 FIG. 1 is movably positioned for horizontal adjustment within the slot 32 of cover 24 and is fastened at 54 to an intermediate portion of transfer arm 53 which projects radially outward of said cover as fragmentarily shown in FIG. 8.

Figure 9:
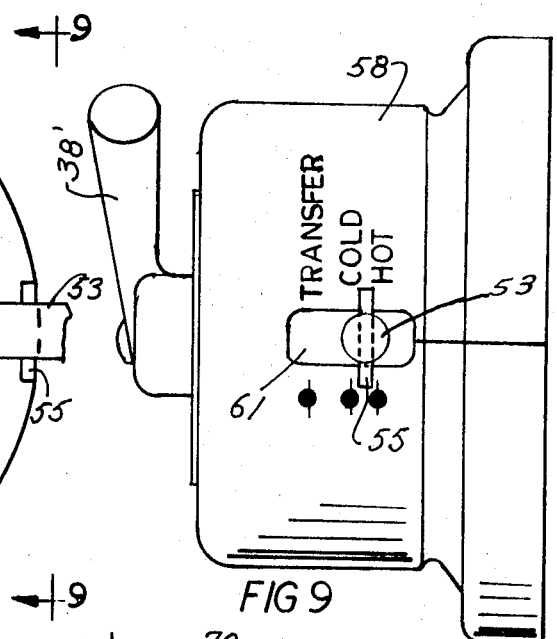
FIG. 9 is a side elevational view taken in the direction of arrows 9—9 of FIG. 8.

Indicator pin 55 extends transversely through said arm FIGS. 8 and 9. Said arm at its other end terminates in clevis 56 FIGS. 1 and 10 which extends around opposite sides of actuator sleeve 43 and is pivotally connected thereto by the oppositely arranged inwardly directed pivot pins 57.

Transfer arm 53 may thus be swung in a horizontal plane carrying its fulcrum 52 therewith within the horizontally disposed slot 32 between the stop points 66 and 67, FIG. 10, which represents a bottom plan view of the cover taken in the direction of arrows 10—10 of FIG. 1.

Such swinging movements transmit corresponding rotary movement to the actuator sleeve 43 in turn effecting rotary control movement of the tapered valve 63. The dome-shaped cap 58 encloses the valve cover 24 and is made of such resilient material that its annular bead 59 normally snaps into position within a corresponding annular slot 60 in the exterior surface of said cover FIG. 1 for anchoring the cap in position.

The transfer arm 53 projects through a corresponding slot 61, FIG. 9, formed through cap 58. The indicator pin 55, on pivotal movement of the transfer arm 53 in a vertical plane moves with respect with the indicia 62 shown in FIG. 9 which corresponds to positions of hot, cold and transfer so designated.

Such downward pivotal movement of transfer arm 53 will cause a corresponding upward movement of actuator sleeve 43 for effecting the corresponding vertical adjustment of the temperature controlling valve element 73, hereinafter described.

TAPER VALVE—VOLUME CONTROL—DELIVERY CONTROL

Taper valve 63 includes intermediate its ends the annular tapered portion 64 adapted for cooperative nesting and registry within the tapered bore 16 of the valve body and is normally biased in such seated position by the yieldable leaf spring 65 interposed between the valve body and said tapered valve FIG. 1.

Figure 12:
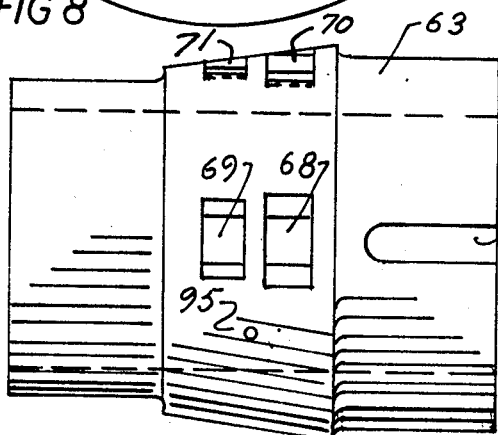
FIG. 12 is a side elevational view taken in the direction of arrows 12—12 of FIG. 11.
Figure 11:
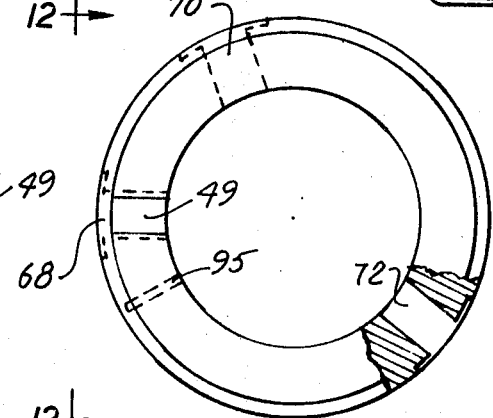
FIG. 11 is a fragmentary plan view of the tapered sleeve valve.

The tapered portion of the tapered valve is best shown in FIGS. 11 and 12 and includes three sets of pairs of angularly displaced fluid inlet and outlet ports.

The first pair of axially spaced and aligned inlet ports are designated at 68 and 69 FIG. 12. The second pair of axially spaced and aligned outlet ports are shown at 70 and 71, and a third pair of aligned axially spaced outlet ports are designated at 72.

Said pairs of ports are angularly spaced around valve sleeve 63 and are respectively aligned laterally of the said hot and cold water inlet 18 and 19, the double outlets 22 and 23 and the single outlet spouts 20 and 21. The said pairs of ports may be interchangeably employed either as inlets or outlets for the selective registry on manual rotation of the valve sleeve 63.

One of said pairs of ports is adapted for lateral registry respectively, with the inlets 18 and 19 to permit the passage of hot and cold water for example into the mixing chamber upon the interior of the valve. At the same time one additional pair of said sets of valve sleeve ports will be in registry with one of the three other sets of outlets 20, 21 and 22–23, respectively.

For example, as shown in FIG. 2, the ports 68 and 69 are in partial registry with the inlets 18 and 19 whereas the additional valve sleeve port 70 and 71 are in registry with the double outlets 22–23.

Figure 7:
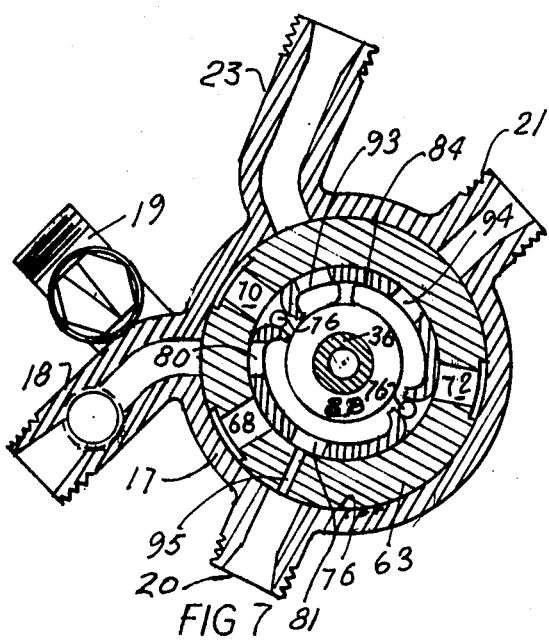
FIG. 7 is a plan section taken in the direction of arrows 7—7 of FIG. 1, illustrating the offsetting of the main flow control valve.

FIG. 7 shows an intermediate rotated position of the tapered valve closing off all flow corresponding possibly to the fragmentary positioning of the control arm 53 shown in FIG. 8 which is an "off" condition. Vent 95 permits movements of valve elements 73 and 84.

On manual rotation of the transfer arm 53 throughout the horizontal arc between stops 66 and 67, FIG. 10, the respective inlets 18 and 19 may be connected to the single spout 20, the single spout 21, or to the double spouts 22–23. One set of inlets will convey hot and cold water into the mixing chamber variably depending upon the amount of registry of the said inlets with the respective intake passages 18 and 19 thus determining the volume of flow only of fluid to the mixing chamber.

Figure 13:
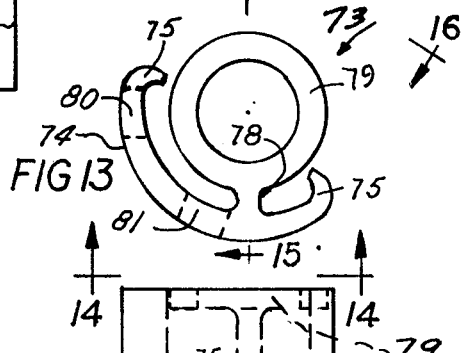
FIG. 13 is a plan view of the temperature control valve element.
Figure 15:
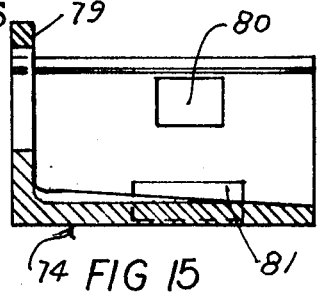
FIG. 15 is an elevational section thereof taken in the direction of arrows 15—15 of FIG. 13.
Figure 14:
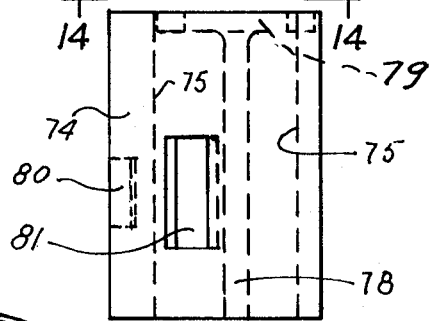
FIG. 14 is an elevational view thereof taken in the direction of arrows 14—14 of FIG. 13.

The outer or tapered valve sleeve 63 includes a cylindrical bore 63' FIG. 1 within which are positioned a pair of opposed separately operable semicylindrical valve elements 73 and 84 shown in detail in FIGS. 13 through 16 and FIGS. 17 through 19, respectively. First cylindrical valve element 73 has a substantially semicylindrical wall 74 which is in sliding engagement with bore 63' and includes, as best shown in FIG. 13, elongated opposed inturned stop edges 75. These stop edges slidably bear against and are retained by the opposed pair of guide rods 76 which extend axially of the valve body and are anchored at 77 FIG. 1 upon the valve base 13. Guide rods 76 cooperate with the valve element 74 limiting said valve element to axial movements under the control of the reciprocal actuator sleeve 43 connected thereto loosely as shown in FIG. 1.

Projecting radially inward from the wall portion 74 of the first valve element is a neck 78 which connects the mounting ring 79 by which the first valve element is loosely positioned over the lower end of the vertically adjustable sleeve 43 and secured thereto.

Within the wall portion of said first valve element there are provided a pair of angularly spaced ports 80 and 81.

As best shown in FIGS. 1 and 2, port 80 is an intake port and depending upon its vertical positioning FIG. 1, is adapted to register variably with the respective hot and cold water intakes 18 and 19 in order to determine the quantity of hot water and the quantity of cold water to be mixed or directed into the mixing chamber. Port 80 is so arranged as to overlap the respective inlet 18 and 19 as to variably control the mixing of said hot and cold water or to provide solely hot water or solely cold water depending upon the longitudinal positioning of the port 80.

The secondary port 81 is vertically elongated so that regardless of the vertical positioning of the valve element said port 81 will serve to communicate with outlet 20 in the event the tapered valve has been so adjusted as to determine that the flow will be through said outlet.

Accordingly, with tapered valve set as for example as shown in FIG. 2, controlled volume of hot and cold water will be directed through inlets 68 and 69, through the corresponding valve element port 80 and into the mixing chamber 83. With this positioning of the outer tapered valve sleeve 63 there can be no flow through the outlet port 81 to spout 20.

The way that the tapered valve is arranged in FIG. 2, outlet flow would be through the double outlets 22 and 23, subject to the control of the second valve element 84 here.

Figure 17:
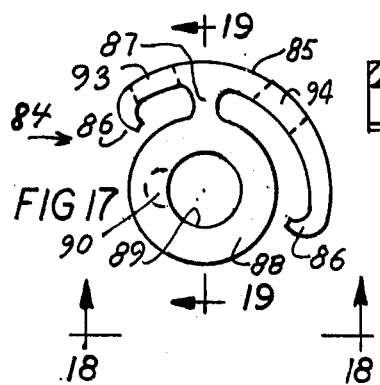
FIG. 17 is a plan view of the second double outlet control valve element.
Figure 19:
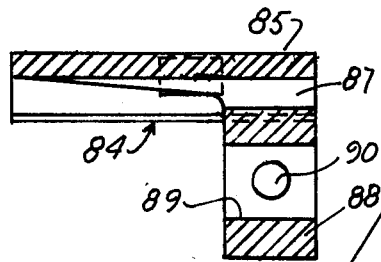
FIG. 19 is an elevational section thereof taken in the direction of arrows 19—19 of FIG. 17.
Figure 18:
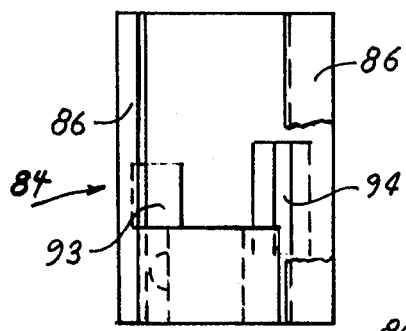
FIG. 18 is a side elevational view thereof taken in the direction of arrows 18—18 of FIG. 17.
Figure 16:
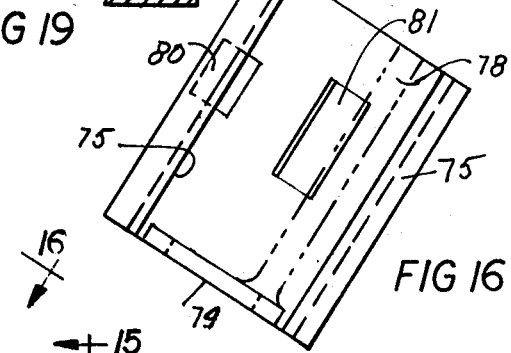
FIG. 16 is a side elevational view thereof taken in the direction of arrows 16—16 of FIG. 13.

Said second semicylindrical valve element is shown in FIGS. 1, 2 and 7 and in detail FIGS. 17, 18 and 19.

Said second valve element includes the semicylindrical wall 85 FIG. 17 whose opposed outer edges are inturned as at 86 for cooperative registry with the guide and retaining pins 76 as best shown in FIG. 2 so as to limit movement of the second valve element 84 to purely axial movements. Said wall portion 85 includes an inner radially extending neck 87 which joins the ring 88 whose bore 89 is positioned so as to receive the control stem 36, FIG. 1. Rotary adjustment of the control stem 36 is adapted to effect axial adjustment of the second valve element 84.

For this purpose there is provided within the ring 88 a recess 90, and adjacent thereto, formed within said stem, is an angular slot 91, there being a suitable ball 92 interposed between the two slots. Accordingly, rotation of the control stem 36 by its handle 38' due to the angular ball and slot arrangement, will cause corresponding axial adjustments of the second valve element 84.

Figure 6:
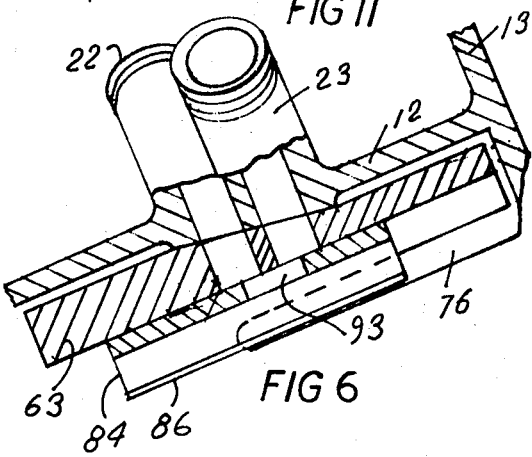
FIG. 6 is a fragmentary section taken in the direction of arrows 6—6 of FIG. 2.

Said second valve element includes outlet ports 93 and 94, FIG. 17 which are angularly spaced and related so that the corresponding port 93 is adapted for overlapping and selective registry with the respective double outlets 22 and 23. Accordingly, axial adjustments of the second valve element 84 will determine whether mixed fluids from the mixing chamber 83 will flow through either of the outlets 22 or 23 or proportioned between those outlets, FIG. 6.

The second port 94 is elongated axially so that regardless of its positioning for regulating flow through the double outlets 22 and 23 will remain in registry with the single spout outlet 21 to permit flow therethrough in the event the tapered valve has been rotated so that an outlet in said tapered valve comes into registry with the respective port 94 and the spout 21. The double outlet can be located at any one of the outlet positions, changing the arrangement of the passages in the first, or in the second valve sleeves.

MODIFIED TAPERED VALVE

Figure 20:
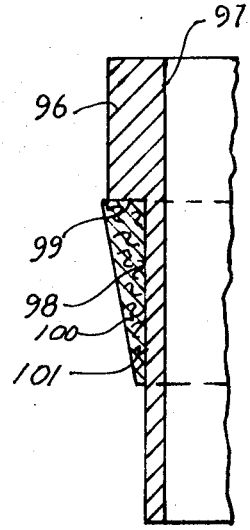
FIG. 20 is a fragmentary longitudinal section of a modified tapered volume control valve corresponding to the valve of FIG. 12.

FIG. 20 illustrates a slight modification of the tapered valve 63 as included tapered valve body 96, cylindrical bore 97 and including an exterior annular slot 98 defining shoulder 99 adapted for cooperative registry with the tapered insert 100 which is fixedly secured as at 101 to the valve body 96 adjacent to said shoulder. Accordingly, should the tapered member 100 wear, it can be replaced.

FILTER ASSEMBLY FOR WATER INLETS

Referring to FIGS. 2, 3 and 4 each of the inlets 18 and 19 have transverse interiorly threaded bores 103 adapted to receive the transversely extending tubes 104 having ports 105 and mounting replaceable filters 106.

The tube 104 has an exterior head 107 by which the tube may be removed for replacement or cleaning of the filters 106. Also tube 104 may be rotated to meter the flow.

OPERATION

The present mixing and diverting valve is in effect a hot and cold water mixer which, depending upon the setting, will deliver either hot or cold or a mixture thereof in varying proportions and in varying volumes as desired for delivery from the mixing chamber either through one or the other of a pair of single outlet ports or though a double outlet port selectively.

This is accomplished by the use of a tapered valve sleeve rotatable by means of a lever for not only controlling volume of flow from the inlets into the mixing chamber but also selecting the desired single or double outlet.

There is furthermore provided a pair of opposed semicylindrical valve elements which are operable independently of each other and both of which are constrained for axial adjustments within the valve body. At the same time the first-mentioned tapered valve is constrained to rotary movement only.

One of the valve elements has an inlet port adapted for variable registry with respect to hot and cold water inlets for determining mixing of hot and cold water into the mixing chamber for providing all hot or all cold depending upon the axial adjustment of said first valve element under the control of the vertically adjustable transfer arm 53 and corresponding control sleeve 43 which is capable of vertical movements as well as rotary movements. The rotary movements of said actuator sleeve 43 through swinging of the arm 53 in a horizontal plane was designed for effecting rotary adjustments of the tapered valve.

The other cylindrical valve element 84 is adapted for axial adjustments on manual rotation of the stem 36 through the handle 38'; and that rotation through the ball and slot arrangement 91-92 provides for controlled axial adjustment of the second valve element 84. This second valve element depending upon its vertical positioning provides a means for controlling whether the mixed fluids within the mixing chamber 83 pass through both of the double outlets 22 and 23 or either thereof in varying amounts depending upon the axial positioning of this second valve element. The second valve element has an additional outlet port 94 whereby flow from the mixing chamber can move through the port 21 provided the tapered valve is properly set for communication therewith.

Said valve elements 73 and 84 have inlets or ports 80-81 and ports 93 and 94 which may be arranged in similar horizontal planes or may be longitudinally displaced.

With respect to FIG. 8 suitable indicia is provided upon the cover plate 34 as a guide for locating the control arm 53 for determining which of the plural outlets are to be connected with the mixing chamber.

It also locates rotation of arm 38' controlling outlets 22 and 23.

Having described my invention reference should now be had to the following claims. I claim:

1. A fluid mixing valve comprising:
   a hollow, generally cylindrical, vertically arranged valve body closed at one end and having a rotatable control stem extending through a seal at the opposite end;
   said body having a tapered bore and two axially spaced inlets, and spaced therefrom, two axially spaced outlets and a pair of laterally spaced radial outlets;
   a first valve sleeve having a cylindrical bore externally tapered and rotatably mounted in said tapered bore and nonmovable axially;
   said first valve sleeve having a first pair of axially spaced and aligned inlet ports, a second pair of axially spaced and aligned outlet ports, and a third pair of axially spaced aligned outlet ports, said pairs of ports being angularly spaced around said valve sleeve and respectively aligned laterally of said inlets and outlets;
   whereby said pairs of ports may be interchangeably employed as inlets and outlets respectively for selective registry on rotation of said sleeve with said inlets and with one of said three sets of outlets;
   the registry of the selected pair of ports with said inlets being variable for regulating volume of flow of fluid through said inlets to a mixing chamber within said sleeve;
   an actuator sleeve rotatably mounted on said stem and having a sliding connection with said sleeve valve for rotating the same but adapted for relative axial movement;
   a semicylindrical valve element slidably mounted for axial movement in the bore of said first valve sleeve and being nonrotatable relative to said body;
   said valve element axially connected loosely to said actuator sleeve adapted for controlled axial adjustments on axial adjustment of said actuator sleeve;
   said valve element being provided with an inlet port and an outlet port angularly spaced therefrom;
   said valve element inlet port being angularly aligned with and overlapping said valve body inlets for variably determining the flow of fluids through either or both of said inlets to said mixing chamber;
   the outlet port of said valve element being in registry with one body outlet;
   a second semicylindrical valve element opposed from said first valve element slidably mounted for axial movement in the bore of said first valve sleeve and being in nonrotatable relation to said body;
   said second valve element being axially and slidably mounted upon said control stem for movement independent of said first valve element;
   ball and angular slot means interconnecting said stem and second valve element, whereby rotation of said stem effects controlled axial adjustments of said second valve element;
   said second valve element being provided with a pair of angularly spaced outlet ports;
   one outlet port registering with said second valve body outlet and the other of said second valve element outlet ports being in lateral registry with said body axially spaced outlets selectively registerable with one or both of said axially spaced outlets adapted for delivery through either or both thereof fluids from said mixing chamber;

rotation of said actuator sleeve regulating the degree of registry of one pair of said valve sleeve ports with said valve body inlets and with said first valve element inlet port controlling the volume of fluids admitted to said mixing chamber, and at the same time establishing outlet connection to any of the body outlets;

axial displacement of said actuator sleeve regulating the degree of registry of said first valve element inlet port with said valve body inlet ports to control the proportion of fluid mix admitted from the valve body inlet ports to said mixing chamber;

rotation of said stem effecting axial displacement of said second valve element whereby one of its outlet ports is in selective variable registry with said pair of axially spaced body outlets or either of them.

2. In the mixing valve of claim 1, an axially extending adjustable stop on said valve body normally spaced from said actuator sleeve for limiting axial adjustments thereof in one direction.

3. In the mixing valve of claim 1, spring means interposed between said valve body and first valve sleeve normally biasing said sleeve with respect to said body tapered bore.

4. In the mixing valve of claim 1, the external taper of said first valve sleeve including an annular body portion of reduced diameter, and an exteriorly tapered ring of bearing material on an over said annular body portion and projecting laterally of said valve sleeve for engagement with the body tapered bore.